Patented Nov. 25, 1930

1,783,133

UNITED STATES PATENT OFFICE

HEINZ OHLE AND JOHANNA OTHMAR-NEUSCHELLER, OF BERLIN, GERMANY

ETHYL ALCOHOL-GEL

No Drawing. Application filed November 15, 1927, Serial No. 233,516, and in Germany November 30, 1926.

My invention relates to the manufacture of ethyl-alcohol-gels.

In the manufacture of solid alcohol as hitherto practised soaps with certain additions such as shellac, stearin and sodium silicate are used as a constituent thereof; in some cases collodion, nitrocellulose, cellulose-acetate or gelose are employed in substitution thereof. But solid alcohol so produced may be only utilized in a proper way for burning purposes.

Our object is to produce an ethylalcohol-gel, that is a new composition, which is perfectly soluble in water, tasteless, inodorous and colourless and from which the pure or a diluted alcohol can be readily recovered, so that the said composition may be used for various purposes, particularly for making food-stuff, beverages, for medicinal, technical or industrial purposes, without sacrificing any of the advantages inherent to the physical condition of a solid body and which chiefly reside in the reduction of shipping, transport, packing and storage-costs.

In general I produce the said ethylalcohol-gel according to the present invention by adding to or incorporating with ethylalcohol any of the alkali or alkali-earth metal salts of the sulphuric acid half-esters of acetone derivatives of sugars and polyvalent alcohols such as diacetone-glucose, diacetone-galactose, α-and β-diacetone-fructose and acetone-glycerine.

In general it is only necessary for the present purpose to dissolve any of the said substances in an adequate quantity of boiling ethylalcohol and to allow the solution to cool down, so as to congeal and form a jelly-like or gelatinous substance of more or less density just in accordance with the proportions of the constituents employed and which will form a colourless, tasteless and odourless gel.

While a large number of chemical substances, as above indicated, are useful for the purpose aimed at, we find that the potassium salt of the α-diacetone-fructose sulphuric acid is particularly adapted for the production of an alcohol-gel of the stated kind, inasmuch as even small addition of only 1 to 2 percents thereof will be sufficient to obtain a composition or gel, which is stable at room-temperature.

α-diacetone fructose sulphuric acid has the structural formula as follows:

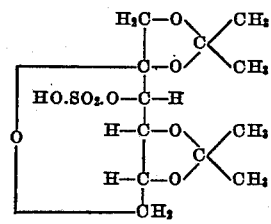

Gels produced in the described manner are capable of liberating pure and unchanged alcohol upon heating or when subjected to a compressing treatment by means of mechanical or any other suitable pressing apparatus without thereby changing the chemical character of the added congealing substance, so that the latter may be used again and without any limitation for the present process.

The congealing substances which, as above indicated are adapted for use in carrying the present invention into effect are of soluble nature, so that the produced gel, upon addition of water, will dissolve therein and the thus diluted alcohol will also form a solution of the congealing substance. As the latter, however, is of absolutely indifferent nature that is to say tasteless, odourless and not of toxic character any such solutions may be used in absolutely the same way like diluted alcohol for various appropriate purposes, the more so since the solutions are perfectly colourless and as clear as crystal.

From the foregoing it will be seen that the important value and merits of the invention do not reside only in the reduction of shipping, transportation, packing and storage-costs as involved in trading with liquid alcohol, but mainly lie in the fact that an alcohol gel or composition prepared in accordance with the present invention may be employed for various purposes or in all cases where otherwise the liquid alcohol or its solutions are used.

We shall now proceed to describe more in detail by way of example, a few practical ways of carrying the invention into effect.

Example 1

We dissolve 20 gr. of the potassium salt of the α-diacetone-fructose sulphuric acid in 20 gr. water, heat to approximately 100° C. and we add to the solution 1 liter of ethyl-alcohol containing 95% of absolute alcohol. While adding the alcohol we agitate the mixture by stirring and then allow the same to stand and cool for about 15 minutes. The resulting product is a congealed mass of colourless appearance.

Example 2

We heat 1 liter of ethyl alcohol containing 95% of absolute alcohol to its boiling point and we add to the hot liquid 20 gr. of the potassium salt of the α-diacetone-fructose sulphuric acid. We continue to heat the mixture until a clear solution is obtained, which upon cooling will form the same product as described in the first example.

What we claim is:

1. As a new composition of matter a solidified ethylalcohol containing an alkali-salt of the sulphuric acid half-esters of acetone-derivatives of sugars or polyvalent alcohols as the solidifying agent.

2. As a new composition of matter a solidified ethylalcohol containing an alkaline earth metal salt of the sulphuric acid half-esters of acetone-derivatives of sugars or polyvalent alcohols.

3. As a new composition of matter, a solidified solution containing about 20 parts by weight an alkali-salt of the sulphuric acid half-esters of acetone-derivatives of sugar or polyvalent alcohols and about 800 parts by weight of ethylalcohol.

4. As a new composition of matter, a solidified solution containing about 20 parts by weight of an alkaline earth metal salt of the sulphuric acid half-esters of acetone-derivatives of sugar or polyvalent alcohols and about 800 parts by weight of ethylalcohol.

5. As a new composition of matter, a solidified solution of the potassium salt of the α-diacetone-fructose sulphuric acid and ethylalcohol.

6. As a new composition of matter a solidified or solid solution of about 20 parts by weight of the potassium salt of the α-diacetone-fructose sulphuric acid and about 800 parts by weight of ethyl-alcohol.

In testimony whereof we affix our signatures.

Dr. HEINZ OHLE.
JOHANNA OTHMAR-NEUSCHELLER.